(12) United States Patent　　(10) Patent No.: US 12,068,527 B2
Hsu et al.　　(45) Date of Patent: Aug. 20, 2024

(54) ANTENNA STRUCTURE AND WIRELESS COMMUNICATION DEVICE USING SAME

(71) Applicant: Chiun Mai Communication Systems, Inc., New Taipei (TW)

(72) Inventors: Cho-Kang Hsu, New Taipei (TW); Min-Hui Ho, New Taipei (TW); Te-Chang Lin, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 338 days.

(21) Appl. No.: 17/136,896

(22) Filed: Dec. 29, 2020

(65) Prior Publication Data

US 2021/0210837 A1　Jul. 8, 2021

(30) Foreign Application Priority Data

Jan. 6, 2020　(CN) .......................... 202010009650.8

(51) Int. Cl.
*H01Q 1/24*　(2006.01)
*H01Q 13/10*　(2006.01)
*H04B 1/00*　(2006.01)

(52) U.S. Cl.
CPC ............. *H01Q 1/243* (2013.01); *H01Q 13/10* (2013.01); *H04B 1/006* (2013.01)

(58) Field of Classification Search
CPC .......... H01Q 1/243; H01Q 13/10; H01Q 1/42; H01Q 13/16; H01Q 1/38; H01Q 1/48; H01Q 1/50; H01Q 5/35; H04B 1/006
See application file for complete search history.

(56) References Cited

U.S. PATENT DOCUMENTS

| 2014/0253398 | A1* | 9/2014 | Hsieh | H01Q 5/328 343/745 |
| 2015/0318601 | A1* | 11/2015 | Lin | H01Q 5/328 343/702 |
| 2016/0336644 | A1* | 11/2016 | Lee | H01Q 5/357 |
| 2017/0012347 | A1* | 1/2017 | Ohguchi | H01Q 9/14 |
| 2017/0048363 | A1* | 2/2017 | Lee | H01Q 5/314 |
| 2017/0187112 | A1* | 6/2017 | Kuang | H01Q 1/243 |

(Continued)

FOREIGN PATENT DOCUMENTS

| CN | 205543232 U | 8/2016 | |
| WO | WO-2018219112 A1 * | 12/2018 | ............. H01Q 1/243 |

*Primary Examiner* — Hasan Islam
*Assistant Examiner* — Bamidele A Immanuel
(74) *Attorney, Agent, or Firm* — ScienBiziP, P.C.

(57) ABSTRACT

An antenna structure with wide radiation bandwidth in a reduced physical space includes a housing, a first feed portion, and a second feed portion. The housing includes a metallic side frame, a metallic middle frame, and a metallic back board. The metallic side frame defines first and second gaps, and the metallic back board defines a slot. The slot, the first gap, and the second gap divide the metallic side frame to give a first radiation portion. The first and second feed portions are both electrically connected to the first radiation portion. When the first feed portion supplies a current, the current flows through the first radiation portion, toward the second gap to excite a first working mode. When the second feed portion supplies a current, the current flows through the first radiation portion, toward the first gap to excite a second working mode.

9 Claims, 12 Drawing Sheets

(56) References Cited

U.S. PATENT DOCUMENTS

| | | | | |
|---|---|---|---|---|
| 2017/0237150 A1* | 8/2017 | Soh | H01Q 5/371 | 343/702 |
| 2017/0244818 A1* | 8/2017 | Kim | H01Q 1/243 | |
| 2018/0026333 A1* | 1/2018 | Lee | H01Q 13/18 | 343/702 |
| 2018/0026334 A1* | 1/2018 | Chen | H01Q 13/18 | 343/702 |
| 2018/0026336 A1* | 1/2018 | Chen | H01Q 1/243 | 343/702 |
| 2018/0026337 A1* | 1/2018 | Chen | H01Q 1/243 | 343/702 |
| 2018/0026346 A1* | 1/2018 | Lee | H01Q 5/10 | 455/575.7 |
| 2018/0026347 A1* | 1/2018 | Lee | H01Q 5/10 | 455/575.7 |
| 2018/0026348 A1* | 1/2018 | Lee | H01Q 5/371 | 455/575.5 |
| 2018/0026349 A1* | 1/2018 | Lee | H01Q 1/44 | 455/575.7 |
| 2018/0026351 A1* | 1/2018 | Tsai | H01Q 5/10 | 455/575.7 |
| 2018/0026353 A1* | 1/2018 | Tseng | H01Q 5/10 | 455/575.7 |
| 2018/0026354 A1* | 1/2018 | Lin | H01Q 5/335 | 343/702 |
| 2018/0062244 A1* | 3/2018 | Huang | H01Q 5/371 | |
| 2018/0062270 A1* | 3/2018 | Liang | H01Q 1/243 | |
| 2018/0131092 A1* | 5/2018 | Liou | H01Q 1/243 | |
| 2018/0248264 A1* | 8/2018 | Chen | H01Q 9/40 | |
| 2018/0261907 A1* | 9/2018 | Ha | H01Q 13/10 | |
| 2018/0261921 A1* | 9/2018 | Ha | H01Q 9/42 | |
| 2019/0044218 A1* | 2/2019 | Ye | H01Q 5/50 | |
| 2019/0067797 A1* | 2/2019 | Jung | H04M 1/026 | |
| 2019/0181555 A1* | 6/2019 | Lee | H01Q 3/247 | |
| 2019/0181564 A1* | 6/2019 | Kwon | H01Q 1/16 | |
| 2019/0190150 A1* | 6/2019 | Tsou | H01Q 23/00 | |
| 2019/0260112 A1* | 8/2019 | Azad | H01Q 9/42 | |
| 2019/0260114 A1* | 8/2019 | Hu | H01Q 3/24 | |
| 2019/0348750 A1* | 11/2019 | Lin | H01Q 9/42 | |
| 2019/0372223 A1* | 12/2019 | Hsu | H01Q 1/241 | |
| 2020/0076080 A1* | 3/2020 | Liu | H01Q 21/28 | |
| 2020/0321688 A1* | 10/2020 | Khripkov | H01Q 21/28 | |
| 2020/0321988 A1* | 10/2020 | Kim | H04M 1/02 | |
| 2020/0343623 A1* | 10/2020 | Guan | H01Q 5/392 | |
| 2020/0373669 A1* | 11/2020 | Xue | H01Q 5/35 | |
| 2021/0135351 A1* | 5/2021 | Son | H01Q 1/48 | |
| 2021/0226319 A1* | 7/2021 | Sung | H01Q 1/44 | |

* cited by examiner

US 12,068,527 B2

ANTENNA STRUCTURE AND WIRELESS COMMUNICATION DEVICE USING SAME

FIELD

The subject matter herein generally relates to wireless communications and an antenna structure and device.

BACKGROUND

Antennas are for receiving and transmitting wireless signals at different frequencies. However, the antenna structure is complicated and occupies a large space in a wireless communication device, which makes miniaturization of the wireless communication device problematic.

Therefore, there is room for improvement within the art.

BRIEF DESCRIPTION OF THE DRAWINGS

Implementations of the present disclosure will now be described, by way of example only, with reference to the attached figures.

DETAILED DESCRIPTION

Figure 1:
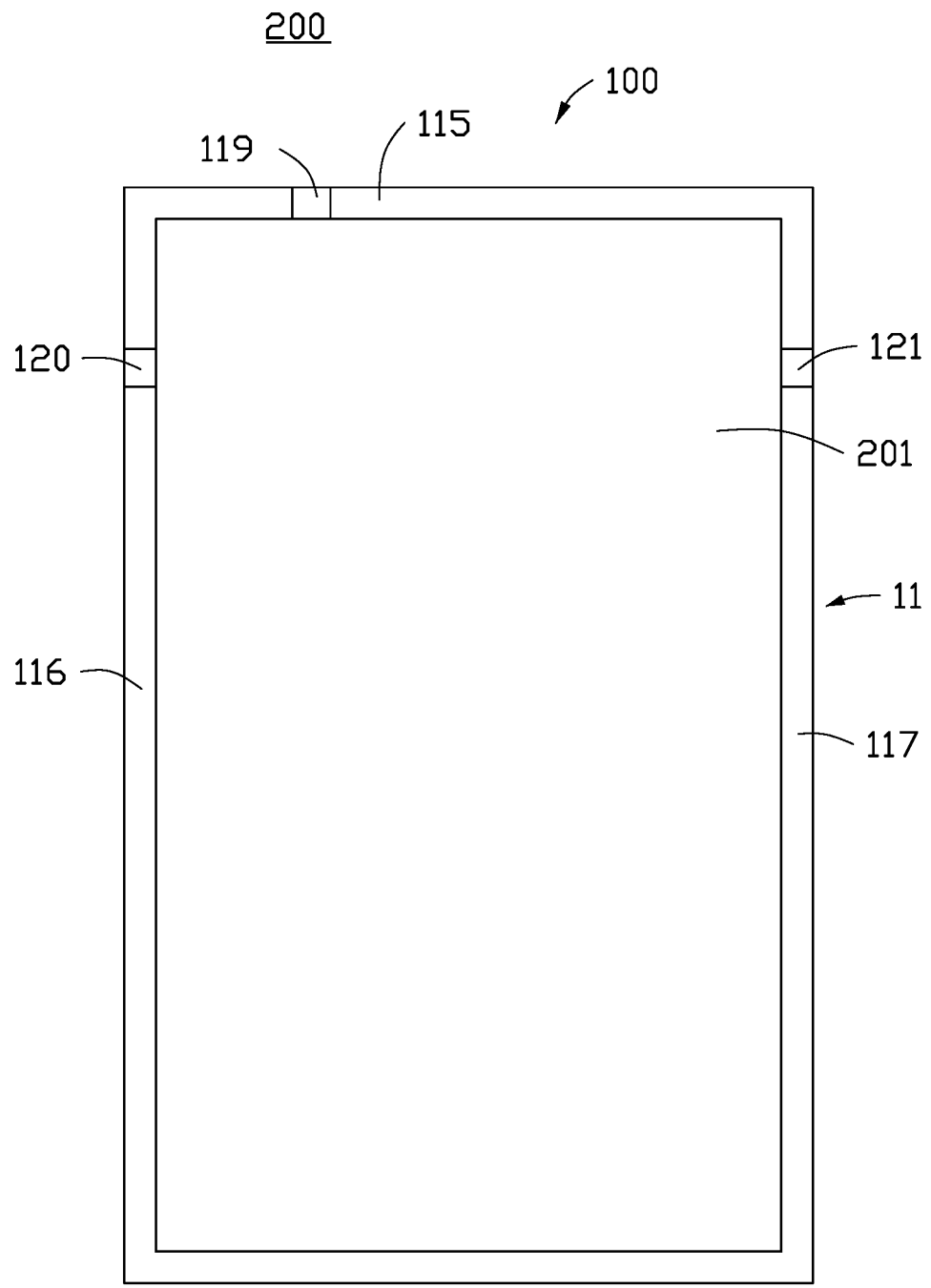
FIG. 1 is a schematic diagram of an embodiment of a wireless communication device including an antenna structure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better show details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

The present disclosure is described in relation to an antenna structure and a wireless communication device using the same.

Figure 2:
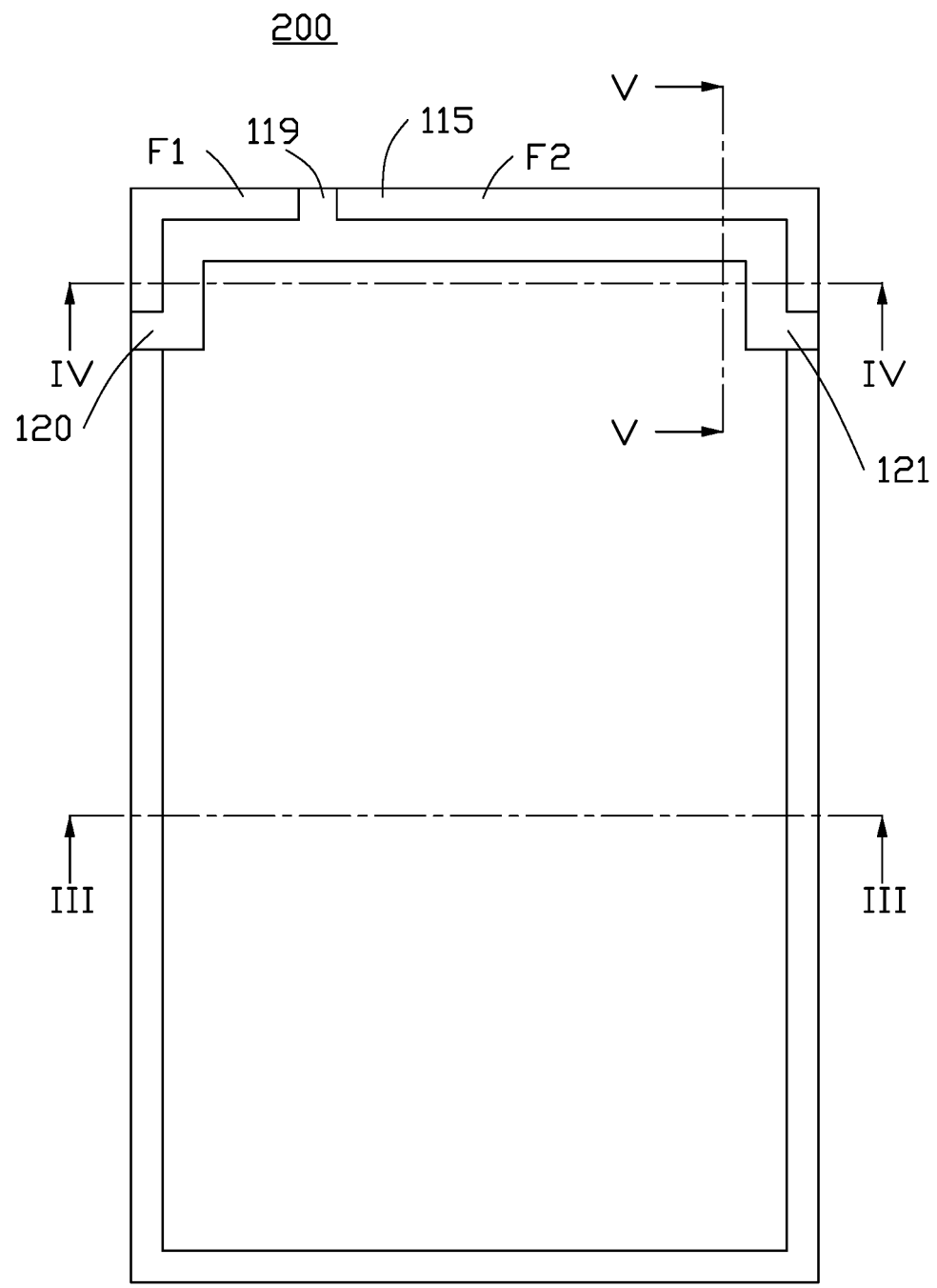
FIG. 2 is similar to FIG. 1, but the wireless communication device is shown from another angle.
Figure 3:
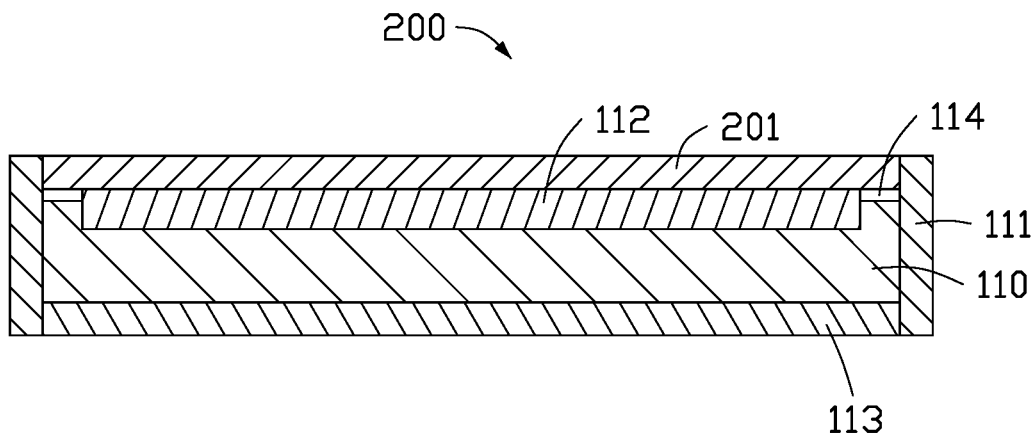
FIG. 3 is a cross-sectional view taken along line III-III of FIG. 2.
Figure 4:
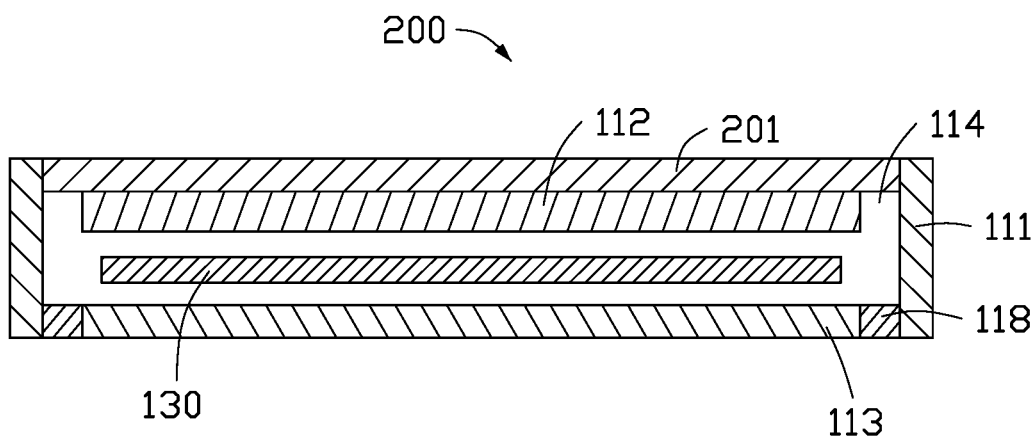
FIG. 4 is a cross-sectional view taken along line IV-IV of FIG. 2.
Figure 5:
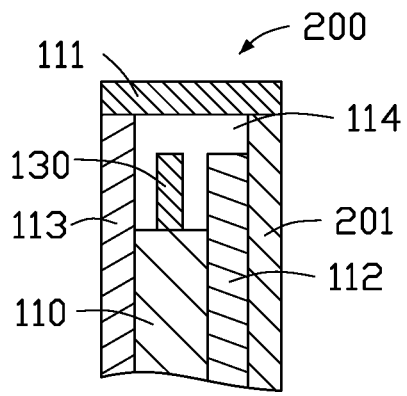
FIG. 5 is a cross-sectional view taken along line V-V of FIG. 2.

FIG. 1, FIG. 2, FIG. 3, FIG. 4, and FIG. 5 illustrate an embodiment of a wireless communication device 200 using an antenna structure 100. The wireless communication device 200 can be, for example, a mobile phone or a personal digital assistant. The antenna structure 100 can transmit and receive radio waves, to exchange wireless signals. FIG. 1 is a schematic diagram of the antenna structure 100 applied to the wireless communication device 200. FIG. 2 is similar to FIG. 1, but shows the wireless communication device 200 from another angle. FIG. 3 is a cross-sectional view taken along line III-III of the wireless communication device 200 of FIG. 2. FIG. 4 is a cross-sectional view taken along line IV-IV of the wireless communication device 200 of FIG. 2. FIG. 5 is a cross-sectional view taken along line V-V of the wireless communication device 200 of FIG. 2.

Figure 6:
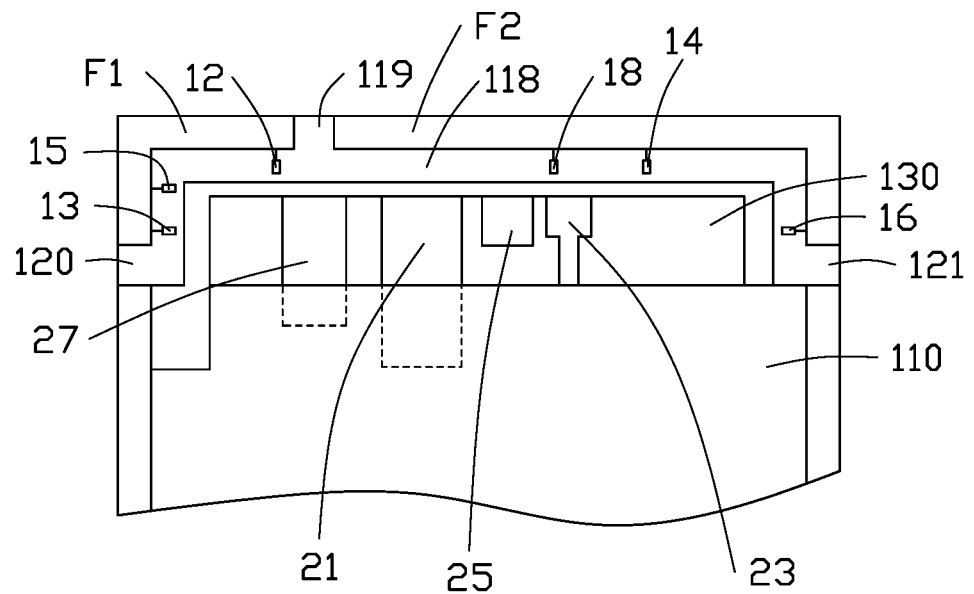
FIG. 6 is an internal schematic diagram of the antenna structure of the wireless communication device of FIG. 1.

As illustrated in FIG. 6, the antenna structure 100 includes a housing 11, a first feed portion 12, a second feed portion 13, a third feed portion 14, a first ground portion 15, a second ground portion 16, and a switch circuit 18. The housing 11 includes at least a system ground plane 110, a side frame 111, a middle frame 112, and a back board 113. The side frame 111, the middle frame 112, and the back board 113 form a space (shown in FIG. 4 and FIG. 5), and the space receives a circuit board 130. The system ground plane 110 may be made of metal or other conductive materials, to provide a ground for the antenna structure 100.

The side frame 111 is substantially a ring structure. The side frame 111 is made of metal or other conductive materials. The side frame 111 is positioned at a periphery of the system ground plane 110. That is, the side frame 111 is positioned around the system ground plane 110. In this embodiment, an edge of one side of the side frame 111 is positioned so as to be spaced from the system ground plane 110, a headroom 114 (shown in FIGS. 3 and 4) is formed between the side frame 111 and the system ground plane 110.

In this embodiment, a distance between the side frame 111 and the system ground plane 110 can be adjusted according to requirements. For example, the distance between the side frame 111 and the system ground plane 110 at different locations may be one distance or different distances.

The middle frame 112 is substantially a rectangular sheet. The middle frame 112 is made of metal or other conductive materials. A shape and size of the middle frame 112 are slightly less than those of the system ground plane 110. The middle frame 112 is stacked on the system ground plane 110.

In this embodiment, an opening (not shown) is defined on a side of the side frame 111 near the middle frame 112, for receiving a display unit 201 of the wireless communication device 200. The display unit 201 has a display plane, and the display plane is exposed through the opening.

The back board 113 is made of metal or other conductive materials. The back board 113 is positioned at an edge of the side frame 111. In this embodiment, the back board 113 is positioned at a side of the system ground plane 110 facing away from the middle frame 112 and is in parallel with the display plane of the display unit 201 and the middle frame 112.

In this embodiment, the system ground plane 110, the side frame 111, the middle frame 112, and the back board 113 form a metal frame that is integrally formed. The middle frame 112 is a metal sheet located between the display unit 201 and the system ground plane 110. The middle frame 112 is used to support the display unit 201, provide electromagnetic shielding, and improve the mechanical strength of the wireless communication device 200.

In this embodiment, the side frame 111 includes at least an end portion 115, a first side portion 116, and a second side portion 117. The end portion 115 is the top end of the wireless communication device 200. That is, the antenna structure 100 constitutes an upper antenna of the wireless communication device 200. The first side portion 116 and the second side portion 117 are positioned opposite to each other. The first side portion 116 and the second side portion 117 are each disposed at one end of the end portion 115 and are preferably disposed vertically.

The housing 11 defines a slot 118 and at least one gap. The slot 118 is defined on the back board 113. The slot 118 is substantially U-shaped and is defined at a side of the back board 113 near the end portion 115 extending towards the first side portion 116 and the second side portion 117.

In this embodiment, the housing 11 defines three gaps, namely a first gap 119, a second gap 120, and a third gap 121. The first gap 119, the second gap 120, and the third gap 121 are defined on the side frame 111. The first gap 119 is defined at the end portion 115 and positioned near the first side portion 116. The second gap 120 is spaced from the first gap 119. The second gap 120 is defined at the first side portion 116 and corresponds to an end of the slot 118 on the first side portion 116. The third gap 121 is spaced from the first gap 119. The third gap 121 is defined at the second side portion 117 and corresponds to an end of the slot 118 on the second side portion 117. The first gap 119, the second gap 120, and the third gap 121 all penetrate and interrupt the side frame 111 and communicate with the slot 118.

In this embodiment, the side frame 111 further defines an earphone hole (not shown). The earphone hole is defined on the end portion 115 and positioned near the second gap 120.

At least two radiation portions are created by the slot 118 and at least one of the gaps 119, 120, or 121 cooperatively dividing the housing 11. In this embodiment, the slot 118, the first gap 119, the second gap 120, and the third gap 121 collectively divide the housing 11 into two radiation portions, namely a first radiation portion F1 and a second radiation portion F2. In this embodiment, the side frame 111 between the first gap 119 and the second gap 120 forms the first radiation portion F1. The side frame 111 between the first gap 119 and the third gap 121 forms the second radiation portion F2.

In this embodiment, the first radiation portion F1 and the second radiation portion F2 are spaced apart from and insulated from the middle frame 112. That is, the slot 118 separates the radiating parts of the frame (that is, the first radiation portion F1 and the second radiation portion F2) and the back board 113. The slot 118 may also separate the frame radiators and the system ground plane 110, and portions other than the slot 118, the side frame 111, the back board 113, and the system ground plane 110 are connected.

In this embodiment, the first gap 119, the second gap 120, and the third gap 121 have the same width. A width of the slot 118 is less than or equal to twice the width of the first gap 119, the second gap 120, or the third gap 121. The width of the slot 118 is 0.5-2 mm. The width of each of the first gap 119, the second gap 120, and the third gap 121 is 1-2 mm.

In this embodiment, the slot 118, the first gap 119, and the second gap 120, and the third gap 121 are all filled with an insulating material (such as plastic, rubber, glass, wood, ceramic, etc., but not limited to these).

Referring to FIG. 6, the wireless communication device 200 further includes at least one electronic component. In this embodiment, the wireless communication device 200 includes at least four electronic components, namely first to fourth electronic components 21, 23, 25, and 27.

The first electronic component 21 is a front lens module. The first electronic component 21 is positioned on an edge of the circuit board 130 adjacent to the second radiation portion F2. The first electronic component 21 is positioned to be insulated from the second radiation portion F2 through the slot 118.

The second electronic component 23 is a proximity sensor. The second electronic component 23 is positioned on the circuit board 130 and is spaced apart from the first electronic component 21.

The third electronic component 25 is a receiver. The third electronic component 25 is positioned on the circuit board 130 and is positioned between the first electronic component 21 and the second electronic component 23. In this embodiment, the second electronic component 23 and the third electronic component 25 are also spaced and insulated from the second radiation portion F2 through the slot 118.

The fourth electronic component 27 is an interface for the microphone and speaker. The fourth electronic component 27 is positioned on the circuit board 130. The fourth electronic component 27 is positioned on a side of the first electronic component 21 away from the second electronic component 23. The fourth electronic component 27 is positioned to correspond to the earphone hole. In this way, an external device, such as an earphone, can be connected through the earphone hole to establish an electrical connection with the fourth electronic component 27.

In this embodiment, a distance between the second electronic component 23 and the slot 118, and a distance between the third electronic component 25 and the slot 118 are both approximately 2-10 mm. In other embodiments, the locations of the first electronic component 21, the second electronic component 23, and the third electronic component 25 can be adjusted and exchanged according to specific requirements.

In this embodiment, the display unit 201 has a high screen-to-body ratio. That is, an area of the display plane of the display unit 201 is greater than 70% of a frontal area of the wireless communication device 200, and even a front full screen can be achieved. In this embodiment, a full screen can be achieved with a slot other than the necessary slot (such as slot 118) defined in the antenna structure 100, the left, the right, and the lower sides of the display unit 201 can be connected to the side frame 111 seamlessly.

In this embodiment, the first feed portion 12 is positioned in the headroom 114 between the system ground plane 110 and the side frame 111. One end of the first feed portion 12 may be electrically connected to a first signal feed point (not shown) on the system ground plane 110 by means of an elastic sheet, a microstrip line, a strip line, or a coaxial cable. The other end of the first feed portion 12 is electrically connected to a side of the first radiation portion F1 near the first gap 119 through a first matching circuit (not shown), to feed current and signals to the first radiation portion F1.

The second feed portion 13 is positioned in the headroom 114 between the system ground plane 110 and the side frame 111. One end of the second feed portion 13 may be electrically connected to a second signal feed point (not shown) on the system ground plane 110 by means of an elastic sheet, a microstrip line, a strip line, or a coaxial cable. The other end of the second feed portion 13 is electrically connected to a side of the first radiation portion F1 near the second gap 120 through a second matching circuit (not shown), to feed current and signals to the first radiation portion F1.

The third feed portion 14 is positioned in the headroom 114 between the system ground plane 110 and the side frame 111. One end of the third feed portion 14 may be electrically connected to a third signal feed point (not shown) on the system ground plane 110 by means of an elastic sheet, a microstrip line, a strip line, or a coaxial cable. The other end of the third feed portion 14 is electrically connected to a side of the second radiation portion F2 near the third gap 121 through a third matching circuit (not shown), to feed current and signals to the second radiation portion F2.

In this embodiment, the first ground portion 15 is positioned between the first feed portion 12 and the second feed portion 13. The first ground portion 15 is also positioned adjacent to the second feed portion 13. One end of the first ground portion 15 may be electrically connected to a first ground point (not shown) on the system ground plane 110 by means of an elastic sheet, a microstrip line, a strip line, or a coaxial cable. The other end of the first ground portion 15 is electrically connected to the first radiation portion F1, to ground the first radiation portion F1.

The second ground portion 16 is positioned in the headroom 114 between the system ground plane 110 and the side frame 111. The second ground portion 16 is also positioned adjacent to the end of the slot 118 close to the second side portion 117. One end of the second ground portion 16 may be electrically connected to a second ground point (not shown) on the system ground plane 110 by means of an elastic sheet, a microstrip line, a strip line, or a coaxial cable. The other end of the second ground portion 16 is electrically connected to the second radiation portion F2, to ground the second radiation portion F2.

In this embodiment, the first feed portion 12, the second feed portion 13, and the third feed portion 14 may be made of iron, copper foil, or a conductor in a laser direct structuring (LDS) process.

Figure 7:
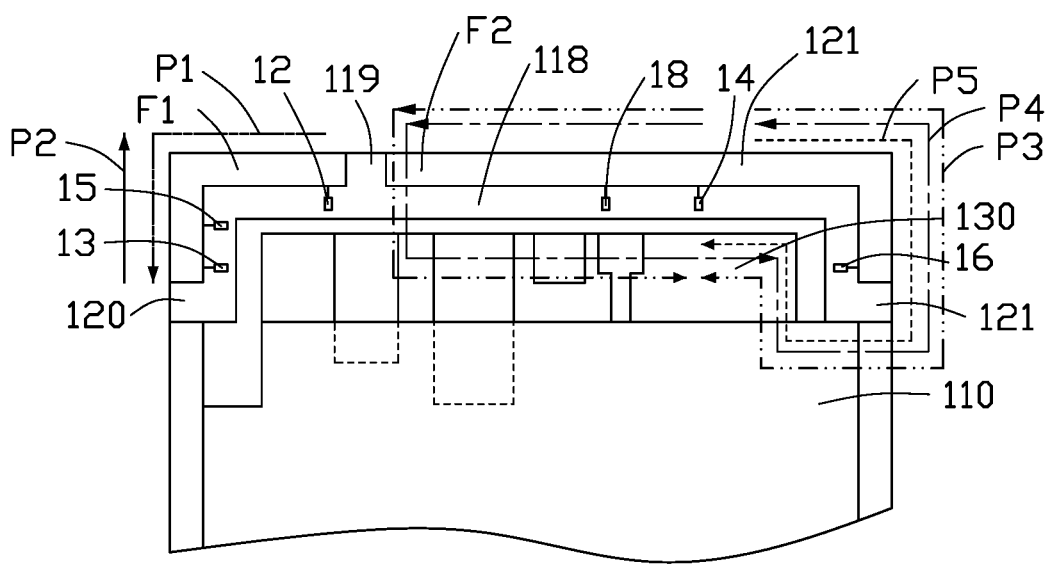
FIG. 7 is a current path distribution graph of the antenna structure of FIG. 6.

FIG. 7 illustrates a diagram of the current paths of the antenna structure 100. When the first feed portion 12 supplies a current, the current flows through the first radiation portion F1, toward the second gap 120, and is grounded through the first ground portion 15 (path P1), to excite a first working mode and generate a radiation signal in a first radiation frequency band.

When the second feed portion 13 supplies a current, the current will flow through the first radiation portion F1, toward the first gap 119, and be grounded through the first ground portion 15 (path P2), to excite a second working mode and generate a radiation signal in a second radiation frequency band.

When the third feed portion 14 supplies a current, the current will flow through the second radiation portion F2, and toward the first gap 119 and the third gap 121 (path P3), to excite a third working mode and generate a radiation signal in a third radiation frequency band.

When the third feed portion 14 supplies a current, the current also flows through the second radiation portion F2 toward the first gap 119, flows to the system ground plane 110 and the middle frame 112, then flows toward the third gap 121, and finally flows back to the third feed portion 14 through the second radiation portion (path P4). Therefore, the second radiation portion F2 forms a monopole antenna to excite a fourth working mode and generate a radiation signal in a fourth radiation frequency band.

When the third feed portion 14 supplies a current, the current also flows through the second radiation portion F2 and toward the third gap 121 (path P5), to excite a fifth working mode and generate a radiation signal in a fifth radiation frequency band.

In this embodiment, the first working mode includes a global positioning system (GPS) mode and a WIFI 2.4 GHz mode. The second working mode is a WIFI 5 GHz mode. The third working mode is a Long Term Evolution Advanced (LTE-A) low frequency mode. The fourth working mode is an LTE-A middle frequency mode. The fifth working mode is an LTE-A high-frequency mode. The frequency of the first radiation frequency band includes 1575 MHz and 2400-2484 MHz. The frequency of the second radiation frequency band is 5150-5850 MHz. The frequency of the third radiation frequency band is 700-960 MHz. The frequency of the fourth radiation frequency band is 1710-2170 MHz. The frequency of the fifth radiation frequency band is 2300-2690 MHz.

In this embodiment, the second ground portion 16 is a middle/high band conditioner (MHC). The MHC may be a capacitor or an inductor. The second ground portion 16 is used to adjust the middle and high frequency bands of the antenna structure 100 and effectively increase its bandwidth and antenna efficiency.

In this embodiment, the side frame 111 and the system ground plane 110 are also electrically connected through methods such as spring, solder, or probe. The location of an electrical connection point between the side frame 111 and the system ground plane 110 can be adjusted according to the radiating frequency required. For example, if the electrical connection point between the side frame 111 and the system ground plane 110 is close to the feed portion (for example, the third feed portion 14), the low frequencies of the antenna structure 100 are shifted toward a higher frequency. When the electrical connection point between the side frame 111 and the system ground plane 110 is kept away from the third feed portion 14, the low frequencies of the antenna structure 100 are shifted to a lower frequency.

In this embodiment, a first end of the switch circuit 18 is electrically connected to the second radiation portion F2. A second end of the switch circuit 18 is electrically connected to the system ground plane 110, i.e. grounded. The switch circuit 18 is configured to switch the second radiation portion F2 to the system ground plane 110, to de-ground the second radiation portion F2, or to switch the second radiation portion F2 to a different ground location (equivalent to switching to a component of different impedance), thereby effectively adjusting a bandwidth of the antenna structure 100, to achieve multi-frequency functions.

In this embodiment, the specific structure of the switch circuit 18 may take various forms, for example, it may include a single switch, a multiple switch, a single switch with a matching component, or a multiple switch with a matching component.

Figure 8A:
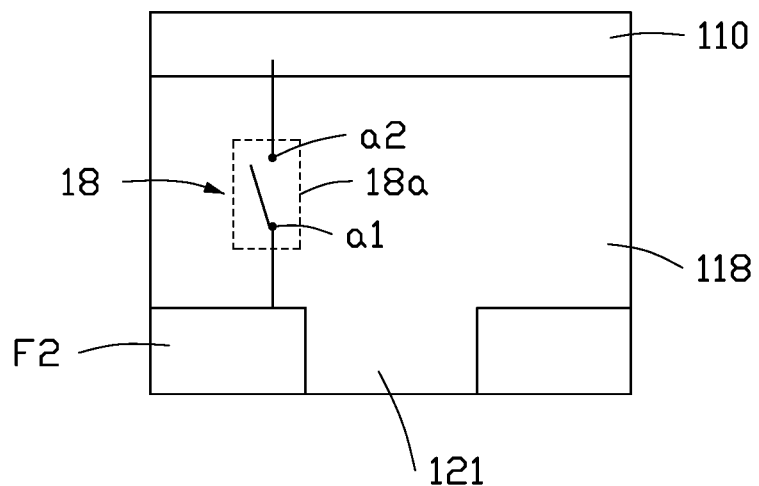
FIGS. 8A, 8B, 8C, and 8D are circuit diagrams of a switch circuit of the antenna structure of FIG. 6.

Referring to FIG. 8A, the switch circuit 18 includes a single switch 18a. The single switch 18a includes a movable contact a1 and a static contact a2. The movable contact a1 is electrically connected to the second radiation portion F2. The static contact a2 of the single switch 18a is electrically connected to the system ground plane 110. Therefore, by controlling the single switch 18a to be turned on or off, the second radiation portion F2 is electrically connected or disconnected from the system ground plane 110. The second radiation portion F2 is also controlled to be grounded or de-grounded, to achieve the functions of multi-frequency.

Figure 8B:
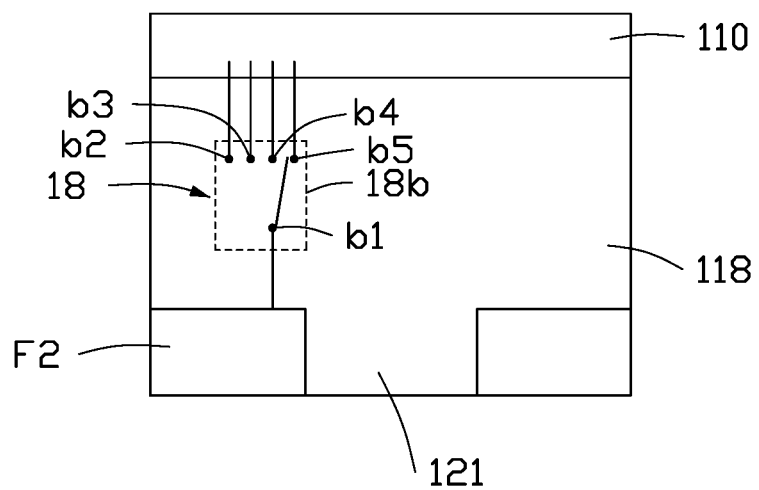

Referring to FIG. 8B, the switch circuit 18 includes a multiplexing switch 18b. In the embodiment, the multiplexing switch 18b is a four-way switch. The multiplexing switch 18b includes a movable contact b1, a first static contact b2, a second static contact b3, a third static contact b4, and a fourth static contact b5. The movable contact b1 is electrically connected to the second radiation portion F2. The first static contact b2, the second static contact b3, the third static contact b4, and the fourth static contact b5 are each electrically connected to different parts of the system ground plane 110.

By controlling the switching of the movable contact b1, the movable contact b1 can be switched to the first static contact b2, the second static contact b3, the third static contact b4, or the fourth static contact b5. Therefore, the second radiation portion F2 may be electrically connected to different positions of the system ground plane 110, thereby achieving multi-frequency functions.

Figure 8C:
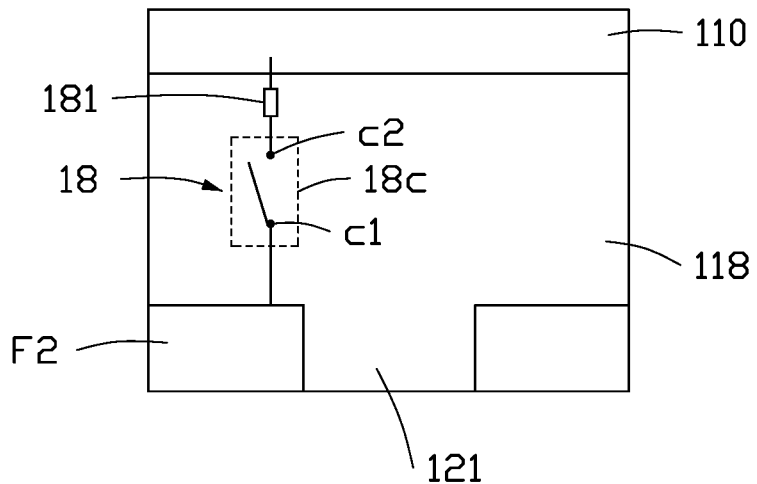

Referring to FIG. 8C, the switch circuit 18 includes a single switch 18c and an impedance-matching component 181. The single switch 18c includes a movable contact c1 and a static contact c2. The movable contact c1 is electrically connected to the second radiation portion F2. The static contact c2 is electrically connected to the system ground plane 110 through the impedance-matching component 181. The impedance-matching component 181 has a preset impedance. The impedance-matching component 181 may include an inductor, a capacitor, or a combination of an inductor and a capacitor.

Figure 8D:
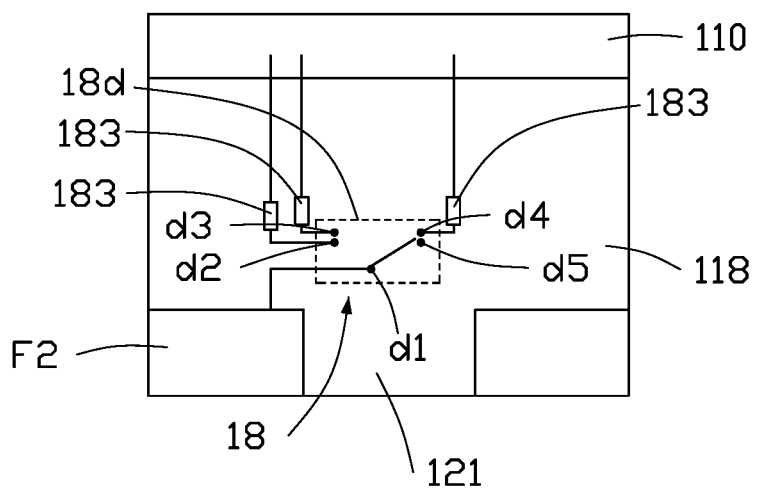

Referring to FIG. 8D, the switch circuit 18 includes a multiplexing switch 18d and at least one impedance-matching component 183. In this embodiment, the multiplexing switch 18d is a four-way switch, and the switch circuit 18 includes three impedance-matching components 183. The multiplexing switch 18d includes a movable contact d1, a first static contact d2, a second static contact d3, a third static contact d4, and a fourth static contact d5. The movable contact d1 is electrically connected to the second radiation portion F2. The first static contact d2, the second static contact d3, and the third static contact d4 are electrically connected to the system ground plane 110 through corresponding impedance-matching components 183. The fourth static contact d5 is suspended. Each of the impedance-matching components 183 has a preset impedance, and the preset impedances of the impedance-matching components 183 may be the same or different. Each of the impedance-matching components 183 may include an inductor, a capacitor, or a combination of an inductor and a capacitor. The location of each of the impedance-matching components 183 is electrically connected to the system ground plane 110 may be the same or different.

By controlling the switching of the movable contact d1, the movable contact d1 can be switched to the first static contact d2, the second static contact d3, the third static contact d4, or the fourth static contact d5. Therefore, the second radiation portion F2 may be electrically connected to the system ground plane 110 or disconnected from the system ground plane 110 through different impedance-matching components 183, thereby achieving the functions of multi-frequency.

Figure 9:
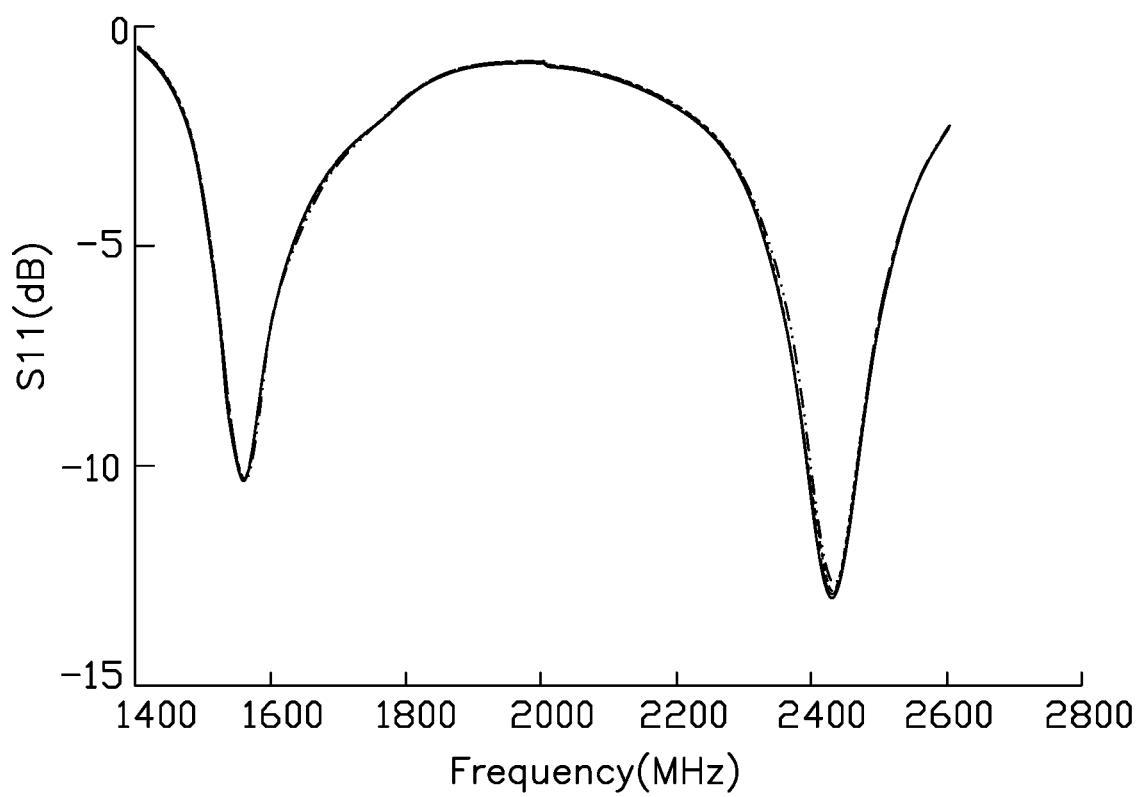
FIG. 9 is a scattering parameter graph when the antenna structure of FIG. 1 works at a Global Positioning System (GPS) mode and a WIFI 2.4 GHz mode.

FIG. 9 is a graph of scattering parameters (S parameters) when the antenna structure 100 works at the GPS mode and the WIFI 2.4 GHz mode. When the switch circuit 18 switches to inductance values of 68 nH, 27 nH, 15 nH, and 6.8 nH, so that the low frequency of the antenna structure 100 is in a frequency band of LTE-A Band17 (704-746 MHz), a frequency band of LTE-A Band13 (746-787 MHz), a frequency band of LTE-A Band20 (791-862 MHz), and a frequency band of LTE-A Band8 (880-960 MHz), respectively, the S11 values when the antenna structure 100 works in GPS mode and WIFI 2.4 GHz mode are roughly the same.

Figure 10:
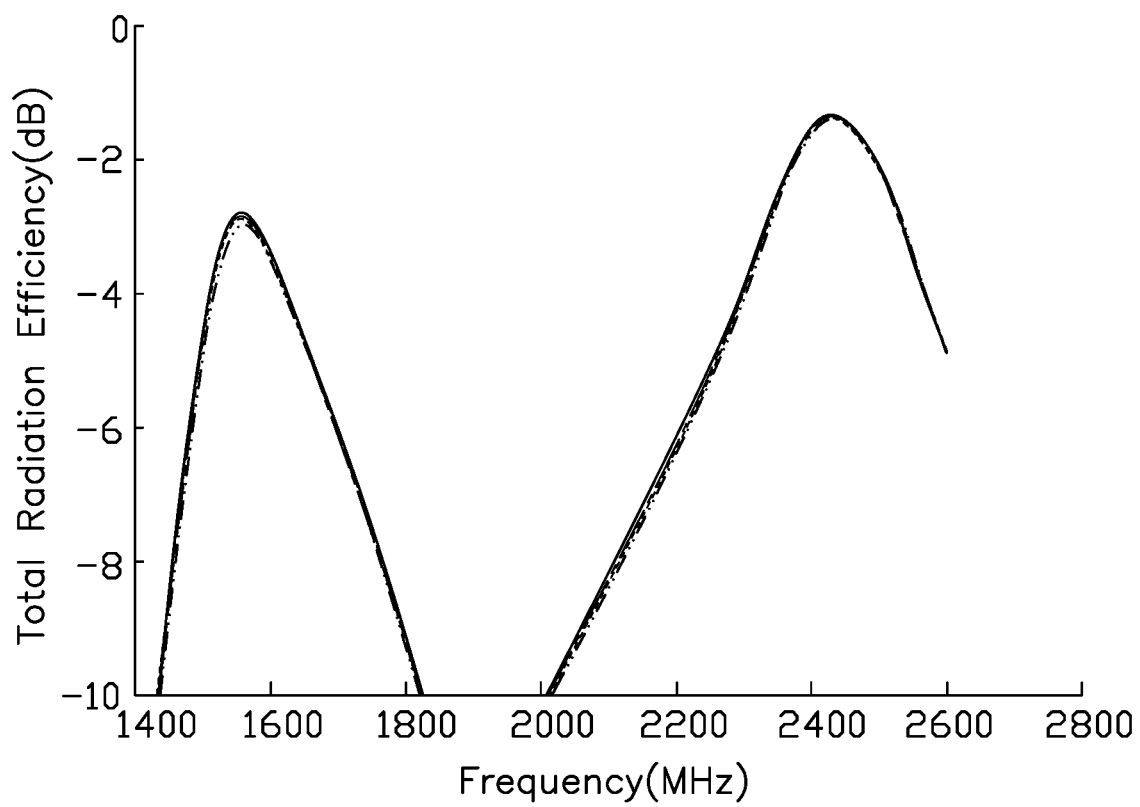
FIG. 10 is a total radiation efficiency graph when the antenna structure of FIG. 1 works at GPS mode and WIFI 2.4 GHz mode.

FIG. 10 is a graph of total radiation efficiency when the antenna structure 100 works at the GPS mode and the WIFI 2.4 GHz mode. When the switch circuit 18 switches to inductance values of 68 nH, 27 nH, 15 nH, and 6.8 nH, so that the low frequency of the antenna structure 100 is in a frequency band of LTE-A Band17 (704-746 MHz), a frequency band of LTE-A Band13 (746-787 MHz), a frequency band of LTE-A Band20 (791-862 MHz), and a frequency band of LTE-A Band8 (880-960 MHz), respectively, the total radiation efficiencies when the antenna structure 100 works in GPS mode and WIFI 2.4 GHz mode are roughly the same.

Figure 11:
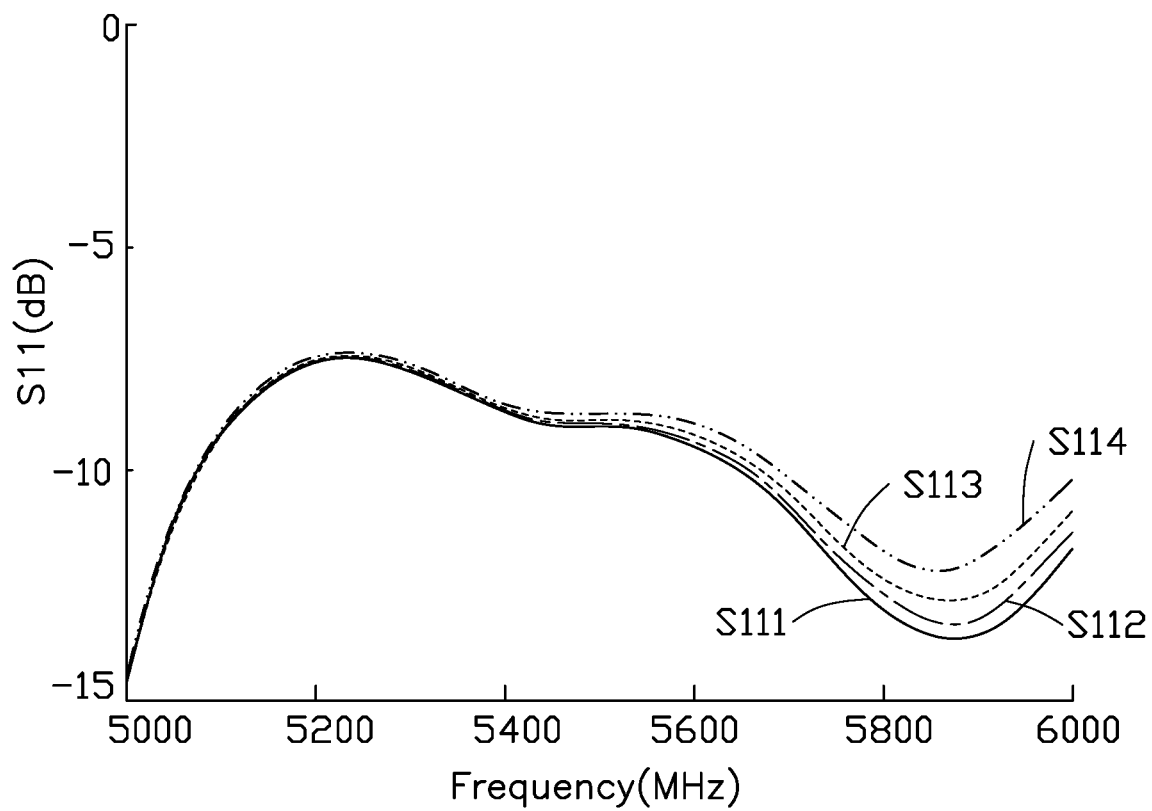
FIG. 11 is a scattering parameter graph when the antenna structure of FIG. 1 works at a WIFI 5 GHz mode.

FIG. 11 is a graph of scattering parameters (S parameters) when the antenna structure 100 works at the WIFI 5 GHz mode. A curve S111 is an S11 value when the switch circuit 18 switches to an inductance value of 68 nH, so that the low frequency of the antenna structure 100 is a frequency band of LTE-A Band17 (704-746 MHz), and the antenna structure 100 works at the WIFI 5 GHz mode. A curve S112 is an S11 value when the switch circuit 18 switches to an inductance value of 27 nH, so that the low frequency of the antenna structure 100 is in a frequency band of LTE-A Band13 (746-787 MHz), and the antenna structure 100 works at the WIFI 5 GHz mode. A curve S113 is an S11 value when the switch circuit 18 switches to an inductance value of 15 nH, so that the low frequency of the antenna structure 100 is in a frequency band of LTE-A Band20 (791-862 MHz), and the antenna structure 100 works at the WIFI 5 GHz mode. A curve S114 is an S11 value when the switch circuit 18 switches to an inductance value of 6.8 nH, so that the low frequency of the antenna structure 100 is in a frequency band of LTE-A Band8 (880-960 MHz), and the antenna structure 100 works at the WIFI 5 GHz mode.

Figure 12:
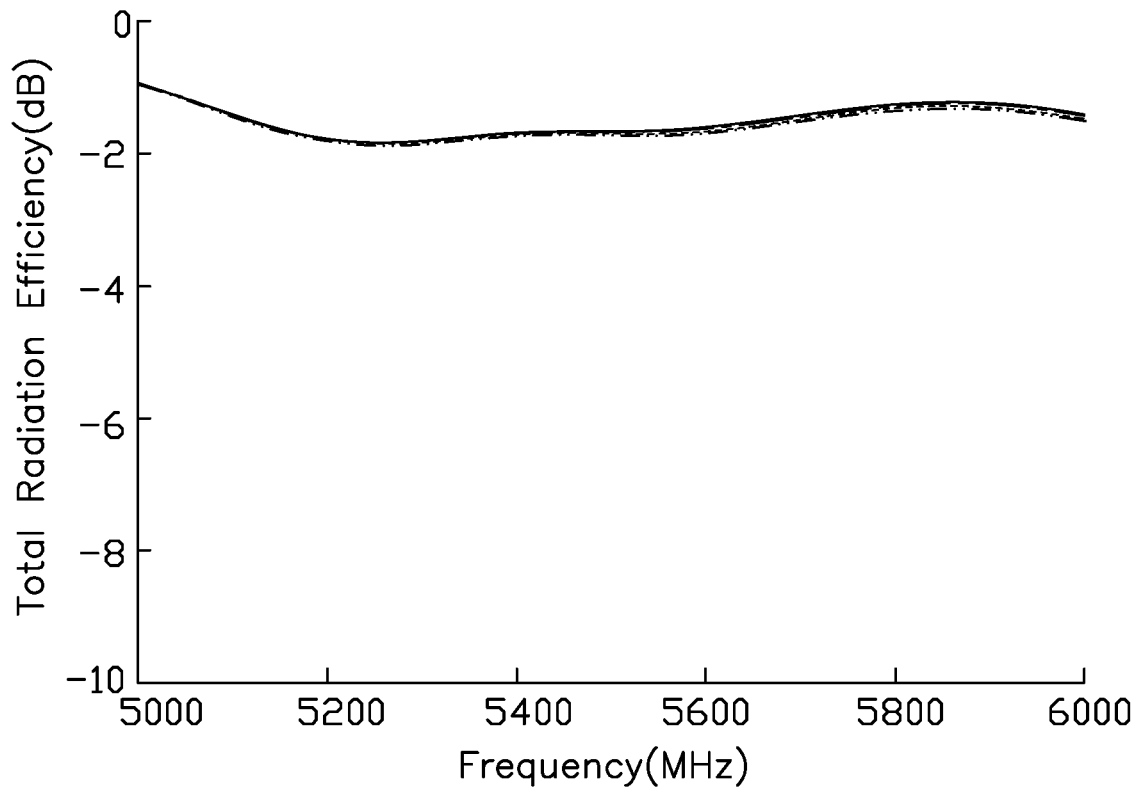
FIG. 12 is a total radiation efficiency graph when the antenna structure of FIG. 1 works at WIFI 5 GHz mode.

FIG. 12 is a graph of total radiation efficiency when the antenna structure 100 works at the WIFI 5 GHz mode. When the switch circuit 18 switches to inductance values of 68 nH, 27 nH, 15 nH, and 6.8 nH, so that the low frequencies of the antenna structure 100 are in a frequency band of LTE-A Band17 (704-746 MHz), a frequency band of LTE-A Band13 (746-787 MHz), a frequency band of LTE-A Band20 (791-862 MHz), and a frequency band of LTE-A Band8 (880-960 MHz), respectively, total radiation efficiencies when the antenna structure 100 works in WIFI 5 GHz mode are roughly the same.

Figure 13:
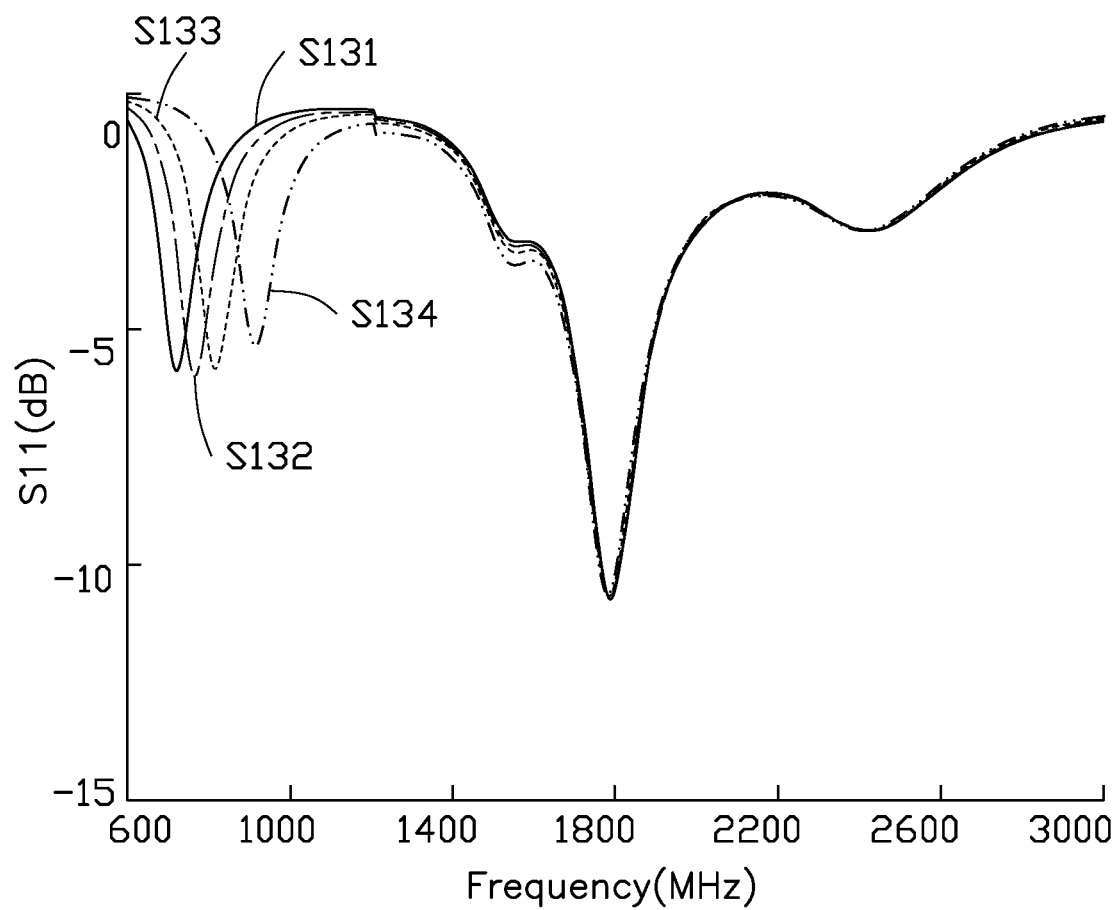
FIG. 13 is a scattering parameter graph when the antenna structure of FIG. 1 works at Long Term Evolution Advanced (LTE-A) low, middle, and high frequency modes.

FIG. 13 is a scattering parameter graph when the antenna structure works at LTE-A low, middle, and high frequency modes. A curve S131 is an S11 value when the switch circuit 18 switches to an inductance value of 68 nH, so that antenna structure 100 works at the frequency band of LTE-A Band17 (704-746 MHz), and the middle, high frequency modes. A curve S132 is an S11 value when the switch circuit 18 switches to an inductance value of 27 nH, so that antenna structure 100 works at the frequency band of LTE-A Band13 (746-787 MHz), and the middle, high frequency modes. A curve S133 is an S11 value when the switch circuit 18 switches to an inductance value of 15 nH, so that antenna structure 100 works at the frequency band of LTE-A Band20 (791-862 MHz), and the middle, high frequency modes. A curve S134 is an S11 value when the switch circuit 18 switches to an inductance value of 6.8 nH, so that antenna structure 100 works at the frequency band of LTE-A Band8 (880-960 MHz), and the middle, high frequency modes.

Figure 14:
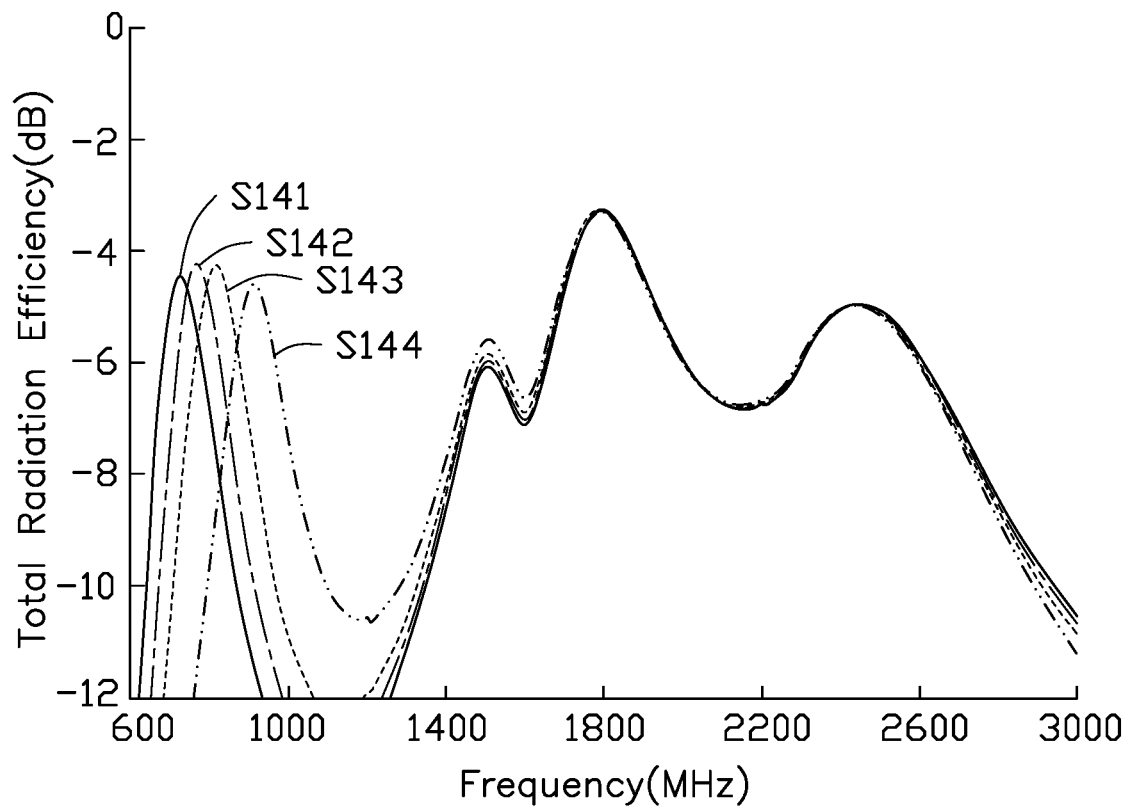
FIG. 14 is a total radiation efficiency graph when the antenna structure of FIG. 1 works at LTE-A low, middle, and high frequency modes.

FIG. 14 is a graph of total radiation efficiency when the antenna structure works at LTE-A low, middle, and high frequency modes. A curve S141 is a total radiation efficiency when the switch circuit 18 switches to an inductance value of 68 nH, so that antenna structure 100 works at the frequency band of LTE-A Band17 (704-746 MHz), and the middle, high frequency modes. A curve S142 is a total radiation efficiency when the switch circuit 18 switches to an inductance value of 27 nH, so that antenna structure 100 works at the frequency band of LTE-A Band13 (746-787 MHz), and the middle, high frequency modes. A curve S143 is a total radiation efficiency when the switch circuit 18 switches to an inductance value of 15 nH, so that antenna structure 100 works at the frequency band of LTE-A Band20 (791-862 MHz), and the middle, high frequency modes. A curve S144 is a total radiation efficiency when the switch circuit 18 switches to an inductance value of 6.8 nH, so that antenna structure 100 works at the frequency band of LTE-A Band8 (880-960 MHz), and the middle, high frequency modes.

FIG. 9 to FIG. 14 show that the antenna structure 100 is provided with the switch circuit 18, to switch between various low frequency modes of the antenna structure 100. This effectively improves the low frequency bandwidth and gives optimal antenna effectiveness. Furthermore, when the antenna structure 100 works in the frequency bands of LTE-A Band17 (704-746 MHz), LTE-A Band13 (746-787 MHz), LTE-A Band20 (791-862 MHz), and LTE-A Band20 (791-862 MHz), the LTE-A middle and high frequency bands are all about 1710-2690 MHz, and the antenna structure 100 can also cover frequency bands of GPS, WIFI 2.4 GHz, and WIFI 5 GHz. That is, when the switch circuit 18 switches across, the switch circuit 18 is only used to change the low frequency mode of the antenna structure 100 without affecting the middle and high frequency modes. This feature is beneficial to a carrier aggregation application (CA) of LTE-A.

The antenna structure 100 can generate various working modes through the switching of the switch circuit 18, such as low frequency mode, middle frequency mode, high frequency mode, GPS mode, WIFI 2.4 GHz mode, and WIFI 5 GHz mode, communication bands as commonly used in the world are covered. Specifically, the antenna structure 100 can cover GSM850/900/WCDMA Band5/Band8/Band13/Band17/Band20 at low frequencies, GSM 1800/1900/WCDMA 2100 (1710-2170 MHz) at middle frequencies, LTE-A Band7, Band40, Band41 (2300-2690 MHz) at high frequencies, frequency bands of GPS, WIFI 2.4 GHz, and WIFI 5 GHz. The designed frequency bands of the antenna structure 100 can be applied to the operation of GSM Qual-band, UMTS Band I/II/V/VIII frequency bands, and LTE 850/900/1800/1900/2100/2300/2500 frequency bands, as are commonly used worldwide.

In other embodiments, the switch circuit 18 is not limited to being electrically connected to the second radiation portion F2, and its location can be adjusted according to specific requirements. For example, the switch circuit 18 may be electrically connected to the first radiation portion F1.

The antenna structure 100 sets at least one gap (such as the first gap 119, the second gap 120, and the third gap 121) on the side frame 111 to create at least two radiation portions out of the side frame 111. The antenna structure 100 further includes the switch circuit 18. Therefore, it can cover multiple frequency bands, such as, low frequency, middle frequency, high frequency, and frequency bands of GPS, WIFI 2.4 GHz, and WIFI 5 GHz through different switching methods, and renders radiation abilities of the antenna structure 100 more effective in broadband ranges compared to a general metal backing. The antenna structure 100 increases the low frequency bandwidth and gives better antenna efficiency, covering the requirements of global frequency band applications and supporting CA. In addition, the antenna structure 100 has a front full screen, and the antenna structure 100 still has good performance in the less-than-optimal environment of the back board 113, the side frame 111, and a large area of grounded metal around it.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An antenna structure comprising:
   a housing, the housing comprising a metallic side frame, a metallic middle frame, and a metallic back board, the metallic middle frame positioned parallel to the metallic back board, the metallic side frame positioned at a periphery of the metallic back board, wherein the metallic side frame defines a first gap and a second gap, the metallic back board defines a slot, the slot, the first gap, and the second gap divide a first radiation portion from the metallic side frame, the metallic side frame positioned between the first gap and the second gap forms the first radiation portion;
   a first feed portion;
   a second feed portion, the second feed portion positioned apart from the first feed portion, the first feed portion and the second feed portion both electrically connected to the first radiation portion for feeding current and signal to the first radiation portion;
   a third feed portion;
   wherein when the first feed portion supplies a current, the current flows through the first radiation portion, toward the second gap to excite a first working mode and generate a radiation signal in a first radiation frequency band;
   when the second feed portion supplies a current, the current flows through the first radiation portion, toward the first gap to excite a second working mode and generate a radiation signal in a second radiation frequency band;

a frequency of the second working mode is higher than a frequency of the first working mode;

wherein the metallic side frame further defines a third gap, the metallic side frame between the first gap and the third gap forms a second radiation portion, when the third feed portion supplies a current, the current flows through the second radiation portion, and toward the first gap and the third gap, to excite a third working mode and generate a radiation signal in a third radiation frequency;

wherein the metallic middle frame, the metallic back board, and the metallic side frame other than the first radiation portion and the second radiation portion are connected to each other to form a system ground plane to provide a ground for the antenna structure; and wherein when the third feed portion supplies a current, the current also flows through the second radiation portion, toward the first gap, flows to the system ground plane and the metallic middle frame, then flows toward the third gap, and finally flows back to the third feed portion through the second radiation portion, to excite a fourth working mode and generate a radiation signal in a fourth radiation frequency band;

wherein the first working mode includes a global positioning system (GPS) mode and a WIFI 2.4 GHz mode, the second working mode is a WIFI 5 GHz mode, the third working mode is a Long Term Evolution Advanced (LTE-A) low frequency mode, and the fourth working mode is an LTE-A middle frequency mode;

wherein the third feed portion is electrically connected to the second radiation portion for feeding current and signal to the second radiation portion;

wherein the metallic side frame comprises an end portion, a first side portion, and a second side portion, the first side portion and the second side portion are respectively connected to both ends of the end portion, the slot is defined on a side of the metallic back board near the end portion and extends in a direction of the first side portion and the second side portion; wherein the first gap is defined on the end portion, the second gap is defined on the first side portion, the third gap is defined on the second side portion;

wherein when the third feed portion supplies a current, the current also flows through the second radiation portion and toward the third gap, to excite a fifth working mode and generate a radiation signal in a fifth radiation frequency band;

wherein the antenna structure further comprises a first ground portion and a second ground portion, wherein the first ground portion is positioned between the first feed portion and the second feed portion, one end of the first ground portion is electrically connected to the system ground plane, the other end of the first ground portion is electrically connected to the first radiation portion, to ground the first radiation portion; wherein one end of the second ground portion is electrically connected to the system ground plane, the other end of the second ground portion is electrically connected to the second radiation portion, to ground the second radiation portion and adjust the frequency bands of the fourth working mode and the fifth working mode.

2. The antenna structure of claim 1, further comprising a switch circuit, wherein one end of the switch circuit is electrically connected to one of the first radiation portion and the second radiation portion, another end of the switch circuit is electrically connected to the system ground plane.

3. The antenna structure of claim 2, wherein the switch circuit comprises a single switch, the single switch comprises a movable contact and a static contact, the movable contact of the single switch is electrically connected to one of the first radiation portion and the second radiation portion, the static contact of the single switch is directly electrically connected to the system ground plane or electrically connected to the system ground plane through an impedance-matching component, and the impedance-matching component has a preset impedance.

4. The antenna structure of claim 2, wherein the switch circuit comprises a multiplexing switch, the multiplexing switch comprises a movable contact, a first static contact, a second static contact, a third static contact, and a fourth static contact, the movable contact is electrically connected to the one of the first and second radiation portions, the first static contact, the second static contact, and the third static contact are directly electrically connected to different locations of the system ground plane or electrically connected to the different locations of the system ground plane through an impedance-matching component, the fourth static contact is directly electrically connected to the system ground plane or suspended, and the impedance-matching component has a preset impedance.

5. A wireless communication device, comprising:
an antenna structure comprising:
a housing, the housing comprising a metallic side frame, a metallic middle frame, and a metallic back board, the metallic middle frame positioned parallel to the metallic back board, the metallic side frame positioned at a periphery of the metallic back board, wherein the metallic side frame defines a first gap and a second gap, the metallic back board defines a slot, the slot, the first gap, and the second gap divide a first radiation portion from the metallic side frame, the metallic side frame positioned between the first gap and the second gap forms the first radiation portion;
a first feed portion;
a second feed portion, the second feed portion positioned apart from the first feed portion, the first feed portion and the second feed portion both electrically connected to the first radiation portion for feeding current and signal to the first radiation portion;
a third feed portion;
wherein when the first feed portion supplies a current, the current flows through the first radiation portion, toward the second gap to excite a first working mode and generate a radiation signal in a first radiation frequency band;
when the second feed portion supplies a current, the current flows through the first radiation portion, toward the first gap to excite a second working mode and generate a radiation signal in a second radiation frequency band;
a frequency of the second working mode is higher than a frequency of the first working mode;
wherein the metallic side frame further defines a third gap, the metallic side frame between the first gap and the third gap forms a second radiation portion, when the third feed portion supplies a current, the current flows through the second radiation portion, and toward the first gap and the third gap, to excite a third working mode and generate a radiation signal in a third radiation frequency;

wherein the metallic middle frame, the metallic back board, and the metallic side frame other than the first radiation portion and the second radiation portion are connected to each other to form a system ground plane to provide a ground for the antenna structure; and wherein when the third feed portion supplies a current, the current also flows through the second radiation portion, toward the first gap, flows to the system ground plane and the metallic middle frame, then flows toward the third gap, and finally flows back to the third feed portion through the second radiation portion, to excite a fourth working mode and generate a radiation signal in a fourth radiation frequency band;

wherein the first working mode includes a global positioning system (GPS) mode and a WIFI 2.4 GHz mode, the second working mode is a WIFI 5 GHz mode, the third working mode is a Long Term Evolution Advanced (LTE-A) low frequency mode, and the fourth working mode is an LTE-A middle frequency mode;

wherein the third feed portion is electrically connected to the second radiation portion for feeding current and signal to the second radiation portion;

wherein the metallic side frame comprises an end portion, a first side portion, and a second side portion, the first side portion and the second side portion are respectively connected to both ends of the end portion, the slot is defined on a side of the metallic back board near the end portion and extends in a direction of the first side portion and the second side portion; wherein the first gap is defined on the end portion, the second gap is defined on the first side portion, the third gap is defined on the second side portion;

wherein when the third feed portion supplies a current, the current also flows through the second radiation portion and toward the third gap, to excite a fifth working mode and generate a radiation signal in a fifth radiation frequency band;

wherein the antenna structure further comprises a first ground portion and a second ground portion, the first ground portion is positioned between the first feed portion and the second feed portion, one end of the first ground portion is electrically connected to the system ground plane, the other end of the first ground portion is electrically connected to the first radiation portion, to ground the first radiation portion;

wherein one end of the second ground portion is electrically connected to the system ground plane, the other end of the second ground portion is electrically connected to the second radiation portion, to ground the second radiation portion and adjust the frequency bands of the fourth working mode and the fifth working mode.

6. The wireless communication device of claim 5, further comprising a display unit, wherein the display unit is accommodated in an opening on one side of the metallic side frame, and the display unit is a full screen.

7. The wireless communication device of claim 5, wherein the antenna structure further comprises a switch circuit, one end of the switch circuit is electrically connected to one of the first radiation portion and the second radiation portion, another end of the switch circuit is electrically connected to the system ground plane.

8. The wireless communication device of claim 7, wherein the switch circuit comprises a single switch, the single switch comprises a movable contact and a static contact, the movable contact of the single switch is electrically connected to one of the first radiation portion and the second radiation portion, the static contact of the single switch is directly electrically connected to the system ground plane or electrically connected to the system ground plane through an impedance-matching component, and the impedance-matching component has a preset impedance.

9. The wireless communication device of claim 7, wherein the switch circuit comprises a multiplexing switch, the multiplexing switch comprises a movable contact, a first static contact, a second static contact, a third static contact, and a fourth static contact, the movable contact is electrically connected to the one of the first and second radiation portions, the first static contact, the second static contact, and the third static contact are directly electrically connected to different locations of the system ground plane or electrically connected to the different locations of the system ground plane through an impedance-matching component, the fourth static contact is directly electrically connected to the system ground plane or suspended, and the impedance-matching component has a preset impedance.

\* \* \* \* \*